United States Patent
Krishnaprasad et al.

(10) Patent No.: US 8,090,722 B2
(45) Date of Patent: Jan. 3, 2012

(54) SEARCHING RELATED DOCUMENTS

(75) Inventors: Muralidhar Krishnaprasad, Fremont, CA (US); Meeten Bhavsar, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 891 days.

(21) Appl. No.: 11/726,275

(22) Filed: Mar. 21, 2007

(65) Prior Publication Data

US 2008/0235210 A1 Sep. 25, 2008

(51) Int. Cl.
*G06F 7/00* (2006.01)
(52) U.S. Cl. ........ 707/741; 707/742; 707/743; 707/744; 707/745; 707/746; 707/747; 707/748; 707/749; 707/750
(58) Field of Classification Search ....... 707/5, 741–750
See application file for complete search history.

(56) References Cited

U.S. PATENT DOCUMENTS

| | | | |
|---|---|---|---|
| 7,747,629 B2 * | 6/2010 | Iyengar et al. | 707/741 |
| 2004/0210567 A1 * | 10/2004 | Bourdoncle | 707/3 |
| 2006/0059144 A1 * | 3/2006 | Canright et al. | 707/5 |
| 2006/0080314 A1 * | 4/2006 | Hubert et al. | 707/5 |
| 2006/0143174 A1 * | 6/2006 | Dey et al. | 707/6 |
| 2007/0255689 A1 * | 11/2007 | Sun et al. | 707/3 |

* cited by examiner

*Primary Examiner* — Etienne Leroux
*Assistant Examiner* — Cindy Nguyen
(74) *Attorney, Agent, or Firm* — Kraguljac & Kalnay, LLC

(57) ABSTRACT

Systems, methods, and other embodiments associated with logically expanding a document and determining the relevance of the logically expanded document to a query are described. One method embodiment includes searching an index to locate a document identifier for a document in which a query term appears. The method includes determining whether the index entry includes an expansion identifier, and, if so, producing a logically expanded document. The logically expanded document may include both a document associated with the document identifier and a document associated with the expansion identifier. The method may then determine a relevance value of the logically expanded document with respect to the query and may provide a signal corresponding to the relevance value.

20 Claims, 5 Drawing Sheets

SEARCHING RELATED DOCUMENTS

BACKGROUND

Documents may be related to other documents. The relationships may include, for example, a document being attached to another document(s), a document having an attachment(s), a document referring to another document(s), a document being referred to by another document(s), and so on. The same attachment may be attached to multiple parents, and one parent may have multiple attachments. Similarly, one document may refer to multiple documents and multiple documents may refer to one document. Thus, the relationships between documents may be m:n relationships.

When a user electronically searches for certain documents that may be relevant to a query, the user may anticipate that related documents (e.g., attachments) are also being considered by their search system. However, this may not be the case, and, if it is the case, the consideration may be inefficient in terms of memory consumed, index space consumed, time consumed, and so on.

In one conventional attempt to provide some functionality for expanded searching, a parent document may have physically included all its related documents and then the parent document may have been indexed. This approach consumed extra index space and caused much duplication. This approach was also unwieldy since recreating and re-indexing of the parent document would be required each time any of the related documents changed.

Another conventional approach to provide some functionality for expanded searching involved indexing documents separately and performing a search over all indexed documents, regardless of indications of any documents being related. Using this approach, no single search based on any single query could provide the expanded search of the virtual document the user might consider is being searched. No single search could succeed because there would be no single "composite" document, either physical or logical, to search.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
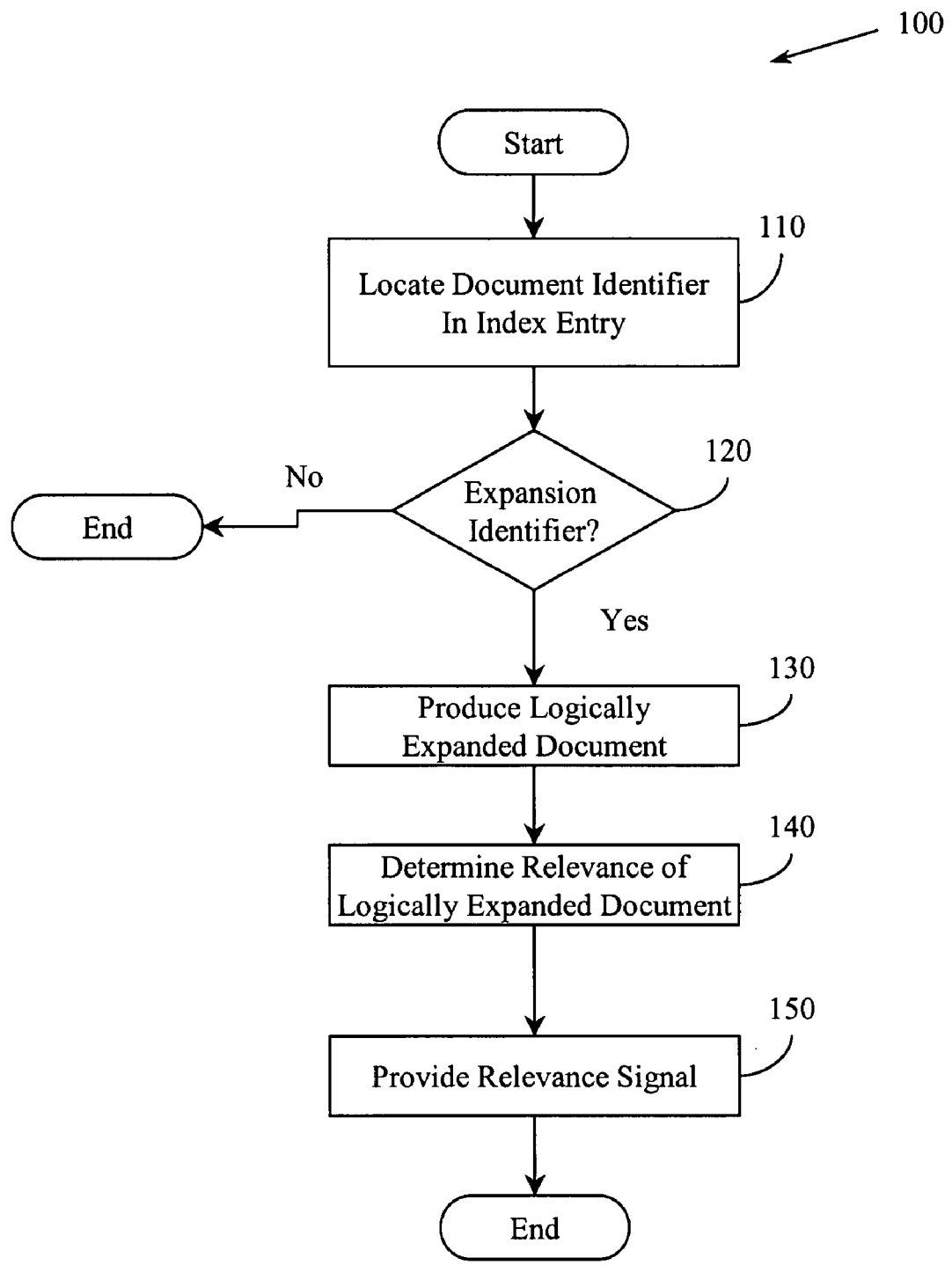
FIG. 1 illustrates an example method associated with logically expanding a document and then determining the relevance of the logically expanded document.

When a user searches for a document that may be relevant to a query, the user may anticipate that a virtual document that includes related documents (e.g., attachments) is being considered (e.g., evaluated) for relevance by the search system they use to do the search. To facilitate efficiently and effectively performing this type of search example systems and methods described herein treat related documents as a single "virtual document" and produce a relevance score based, at least in part, on that entire virtual document. The relevance score may include term frequency calculations, inverse document frequency calculations, nearness calculations, and document inclusion frequency calculations. These calculations may be made on the logically composite "virtual document" rather than on individual physical documents.

Consider an email environment where emails may include attachments or references (e.g., URLs) to other documents. If a user searches for emails relevant to a query, example systems and methods facilitate creating a virtual document that may include both an email and related documents (e.g., attachments, forwarded emails, prior emails). Thus, one portion of a query may be satisfied by text in the email, another portion of the query may be satisfied by text in an attachment, and yet another portion may be satisfied by text in a referenced document.

Consider also a purchase order. A purchase order may list an item, a quantity, and information about a company. The company information itself may be stored in a separate document that stores data including address, corporate form, statutory agent, and so on. The purchase order may include a reference to the document in which the company information is stored. Multiple purchase orders may reference the same company. A search for relevant purchase orders may return more relevant information if both the purchase order and the data corresponding to the company information are searched. For example, a user searching for purchase orders relevant to sales from Redwood City, Calif. may benefit from having an expanded search consider not only the purchase orders themselves but also company documents related to the purchase orders. By way of illustration, a purchase order may have an amount, a data, and a company name. The company name may provide a link to a company document. Thus, a purchase order that lists a company name (e.g., Oracle) may not be determined to be relevant to the Redwood City query unless the expanded search considers the company document, where the address for Oracle may be stored.

Consider further the purchase order situation. A purchase order may also have attachments (e.g., instructions, reference manual, delivery directions, special handling alerts) that describe information beyond the quantity and purchase amount. These attachments may change independently of the purchase order. Once again, a user searching on purchase orders may benefit from having both purchase orders and attachments searched. For example, the user may hear about a snow storm in the Midwest and want to know about purchase orders relevant to "next day air" and "Cleveland". A simple search of a non-expanded document may not identify purchase orders with special shipping instructions while a search of a virtual document that includes both purchase orders and attachments may retrieve more relevant data.

In one example, an inverted index may be used to store not only document identifiers but also expansion identifiers that provide connections to related documents. The connections may facilitate expanding a document to a parent, to an attachment, to an attaching document, to a referenced document, to a referencing document, and so on.

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

"Computer-readable medium", as used herein, refers to a storage medium that stores instructions and/or data. A computer-readable medium may take forms, including, but not limited to, non-volatile media, and volatile media. Non-volatile media may include, for example, optical or magnetic disks and so on. Volatile media may include, for example, semiconductor memories, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Document", as used herein, refers to a set of information stored electronically as a single logical entity. A document may be, for example, a letter, a photograph, a web page, an XML document, an email, and so on. A document may be stored, for example, in a file, in a set of files, in a data store, on a computer-readable medium, and so on.

"Logic", as used herein, includes but is not limited to hardware, firmware, software stored on a computer-readable medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), an analog circuit, a digital circuit, a programmed logic device, a memory device containing instructions, or the like. Logic may include one or more gates, combinations of gates, or other circuit components. Logic may also be fully embodied as software stored on a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Query", as used herein, refers to a semantic construction that facilitates gathering and processing information. A query might be formulated in a database query language like structured query language (SQL) or object query language (OQL). A query might be implemented in computer code (e.g., C#, C++, Javascript) that can be employed to gather information from various data stores and/or information sources.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one skilled in the art that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include different programming languages, systems, and tools. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

FIG. 1 illustrates a method 100 associated with logically expanding a document. The document will be identified as a potentially relevant document when a query term matches an index entry. Method 100 may then determine the relevance of the logically expanded document. In one embodiment, a computer-readable medium may store computer-executable instructions that if executed by a computer cause the computer to perform method 100. Method 100 may include, at 110, locating a document identifier in an index entry. The index entry may be an entry in an inverted index that is indexed on terms and whose entries include document identifiers that identify documents in which a term appears. Thus, the index entry may be selected based on matching a query term.

Method 100 may also include, at 120, determining whether the index entry includes an expansion identifier. An expansion identifier may relate a first document to a second document in different ways. The relationship may include, for example, a document being an attaching document, a document being an attached document, a document being a referencing document, a document being a referenced document, and so on. The expansion identifier may be, for example, a file locator, a GUID (globally unique identifier), a URL (uniform resource locator), a file system value, and so on. While a single expansion identifier is described, it is to be appreciated that in some examples one index entry may include multiple expansion identifiers. An expansion identifier may relate a document to a parent-like document (e.g., document that attaches a document), to a child-like document (e.g., document that is attached to a document), and so on.

Method 100 may also include, at 130, upon determining that the index entry includes an expansion identifier, producing a logically expanded document. In one embodiment, producing a logically expanded document may include making a single virtual document from two or more individual documents. For example, a first document associated with the document identifier in the index entry may be logically reworked to include a document associated with the expansion identifier. A logical document may be produced by establishing values in a data structure (e.g., array, linked list), by manipulating a set of document identifiers, and so on. A logical document may include multiple physical documents and yet the physical documents need not be physically rearranged or physically manipulated to create the virtual document.

Method 100 may also include, at 140, determining a relevance value for the logically expanded document. The relevance value may correspond to how relevant the document is to the query. In one example, determining the relevance of the logically expanded document may include calculating different values that can contribute to the relevance score. The different values may include a term frequency for the term in the query and an inverse document frequency for a document associated with the document identifier and/or for a document associated with an expansion identifier. In one example, determining the relevance of the logically expanded document may also include calculating an expansion inclusion frequency for the document associated with the expansion identifier. This expansion inclusion frequency may correspond to the frequency with which the document associated with the expansion identifier is used to logically expand a document. For example, a document that is frequently used to expand a document may have less effect on the relevancy of the expanded document while a document that is less frequently used to expand a document may have more effect on the relevancy of the expanded document. It will be appreciated by one skilled in the art that different approaches may be taken with respect to the expansion inclusion frequency calculation.

In one example, determining the relevance of the logically expanded document may also include computing a nearness value. For example, upon determining that two or more query terms appear in the logically expanded document a nearness value for the two or more terms may be computed. Since the two terms may appear in a single document or may appear in two different documents used to construct the virtual document, computing the nearness value may also include updating the nearness value with a document size upon determining that a first query term appears in a first document and that a second query term appears in a second document. Consider a query for documents relevant to "john smith". A first document that includes the phrase "john smith lives here" would receive a first nearness score based on the proximity of the words while a second document that includes the phrase "john lives in smith" would receive a second (e.g., lower) nearness score. In both cases, both words appeared in a single document. Consider further a virtual document produced from a first document having 20 words, the first of which is "john", and a second document having 30 words, the last of which is "smith." This virtual document would receive a third (e.g., much lower) nearness score that will reflect the fact that the two terms appeared in separate documents that were combined into the virtual document. In one example, rather than considering the actual position of the second word in the second document, the size of the second document would be added to the location in the first document. A relevance value may be computed from different combinations of the term frequency, inverse document frequency, expansion inclusion frequency, and/or nearness value.

Method 100 may also include, at 150, providing a signal corresponding to the relevance value. The signal may be provided, for example, as a data value presented to a graphical user interface that may then selectively present information concerning a relevant document(s). In one example, the signal corresponding to the relevance value may indicate whether the relevance is based on matches in a single physical document or matches from a complete virtual document. For example, single physical documents that include a complete set of query terms may receive a first (e.g., higher valued)

signal than documents that only cover the complete set of query terms based on the expanded virtual document.

In one example, producing the logically expanded document may include addressing multiple levels of inclusion. For example, one attachment may in turn have another attachment or may refer to another document. Thus, producing the logically expanded document may also include logically including in the logically expended document a document related to the document associated with the expansion identifier.

While FIG. 1 illustrates various actions occurring in serial, it is to be appreciated that various actions illustrated in FIG. 1 could occur substantially in parallel. By way of illustration, a first process could locate document identifiers and determine whether the related index entry has an expansion identifier. Similarly, a second process could produce a logically expanded document while a third process could determine the relevance of the logically expanded document and provide a signal corresponding to the relevance. While three processes are described, it is to be appreciated that a greater and/or lesser number of processes could be employed and that lightweight processes, regular processes, threads, and other approaches could be employed.

Figure 2:
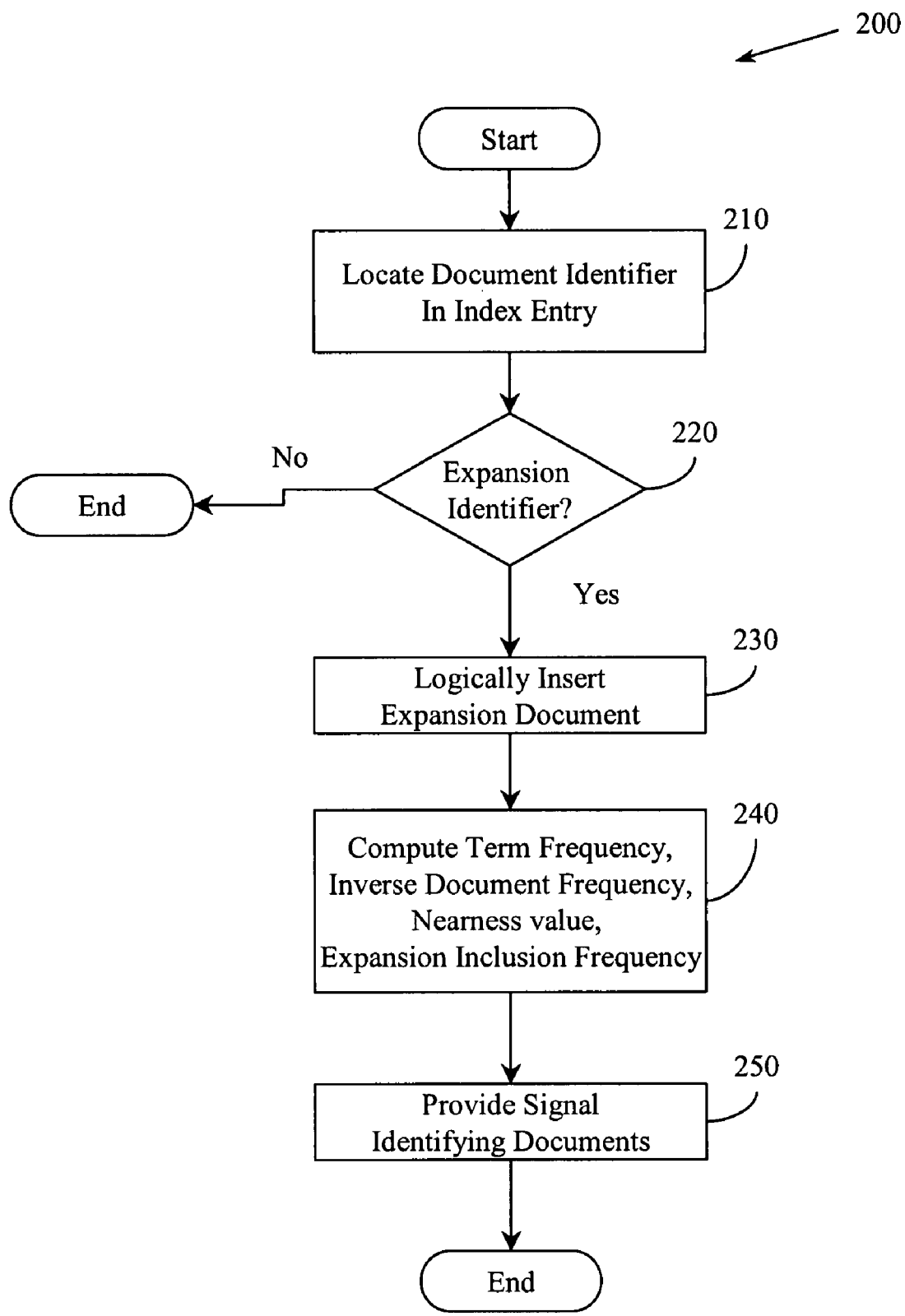
FIG. 2 illustrates another example method associated with logically expanding a document and then determining the relevance of the logically expanded document.

FIG. 2 illustrates a method 200 associated with logically expanding a document and then determining the relevance of the logically expanded document. Like method 100, in one embodiment, a computer-readable medium may store computer-executable instructions that if executed by a computer cause the computer to perform method 200. Method 200 includes some actions similar to those associated with method 100. For example, method 200 includes, at 210, locating a document identifier in an index entry and, at 220, determining whether the index entry has an expansion identifier.

In method 200, a document associated with an expansion identifier may be logically associated with (e.g., logically inserted into), at 230, an expansion document that includes the document associated with the document identifier in the index entry. Logically inserting the document associated with the expansion identifier into the expansion document may include, for example, manipulating pointers, manipulating records, updating a data structure, (e.g., file, linked list) and so on. In method 200, the relevance of the expansion document may then be computed using term frequency calculations, inverse document frequency calculations, expansion inclusion calculations, nearness calculations, and so on.

Method 200 may also include, at 250, providing a signal that identifies a set of documents whose relevance to the query exceeds a threshold. The threshold may be, for example, a pre-determined threshold, a user-configurable threshold, a relative (e.g., top 10%) threshold, and so on. In one example, the set of documents may only include documents identified by a document identifier in an index entry. This facilitates pruning a list of relevant documents to the original (e.g., base, parent) document. In another example, the set of documents may include both documents identified by a document identifier in an index entry and documents identified by an expansion identifier in an index entry. This facilitates providing an expanded list that shows more than just the original (e.g., base, parent) document.

Figure 3:
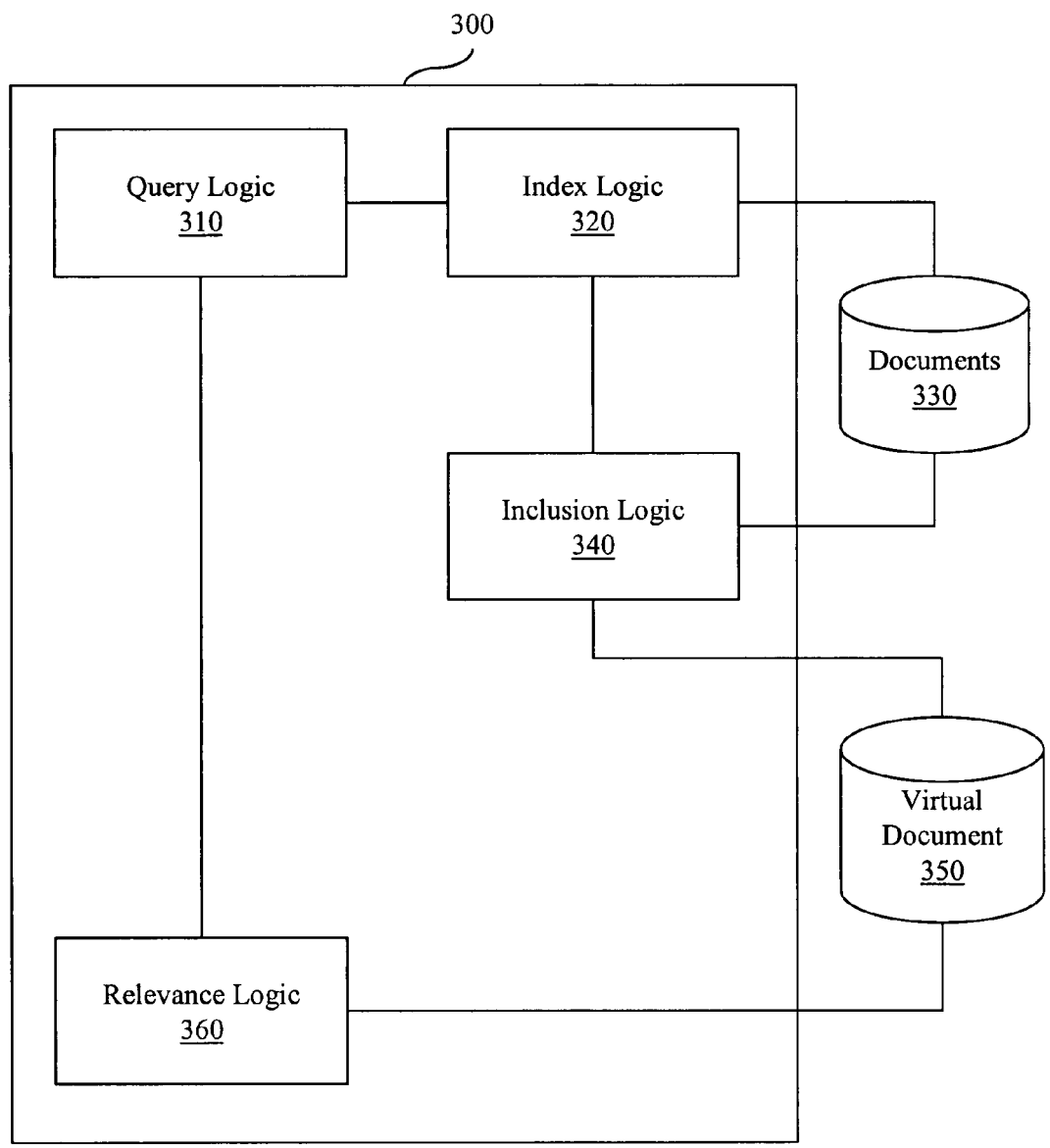
FIG. 3 illustrates an example system associated with identifying, creating, and scoring virtual documents relevant to a query.

FIG. 3 illustrates a system 300 associated with identifying, creating, and scoring virtual documents that may be relevant to a query. System 300 may include a query logic 310 that receives a query. The query may be presented to a system 300 in an attempt to locate documents relevant to the query. A query may include one term or more than one terms.

System 300 may include an index logic 320 to store a set of index entries that store data useful in determining which of the documents 330 are relevant to the query. Query terms may be compared to terms stored in an index (e.g., inverted index) to identify which of documents 330 are relevant to the query. A term matching an index entry may appear in multiple documents.

An index entry may also store an identifier that identifies which of documents 330 are related to documents in which the query term appears. The identifier may be, for example, a file system handle, a GUID, a URL, and so on. A document having an identifier in a matched index entry may be referred to as a base document. Additionally, a document related to the base document may be referred to as a first level document. In one example, a first level document may be related to the base document as an attached document, an attaching document, a referenced document, a referencing document, and so on. The index logic 320 may also provide access to data stored in the set of index entries. For example, the index logic 320 may provide an interface to functions (e.g., get, set, compare) that may be used to examine index entries, to return values from an index entry, to establish a value in an index entry, and so on.

System 300 may also include an inclusion logic 340 that produces a virtual document 350. The virtual document 350 may include both a base level document and a first level document. While a single first level document is described, it is to be appreciated that multiple first level documents may be included. A base level document may be identified by determining that it includes at least one of the query terms. A first level document may be established by determining that it is related to the base level document by a second identifier. Producing the virtual document 350 may include concatenating two documents, appending one document to another document, inserting one document into another document, merging two documents, and so on. While manipulating two documents is described, it is to be appreciated that more than two documents may be manipulated to form the virtual document 350.

System 300 may also include a relevance logic 360 that determines the relevance of the virtual document 350 to the query. In one example, the relevance logic 360 may determine the relevance of the virtual document 350 by computing and using values including a term frequency value, an inverse document frequency value, and a nearness value computed for the entire virtual document 350. For example, a score may be computed by subtracting an inverse document frequency value from a term frequency value and then manipulating the result based on the nearness value. It is to be appreciated that various calculations based on the available values may be employed to determine the relevance value of the virtual document 350. In one example, the nearness value may depend, at least in part, on whether two terms appearing in the virtual document 350 appear in an individual document that was used to produce the virtual document 350 or whether the two terms appear in different individual documents that contributed to the virtual document 350.

In one example, the virtual document 350 may be multi-tiered. For example, the virtual document 350 may include a second level document. The second level document may be related to a first level document as an attaching document, an attached document, a referencing document, a referenced document, and so on.

Figure 4:
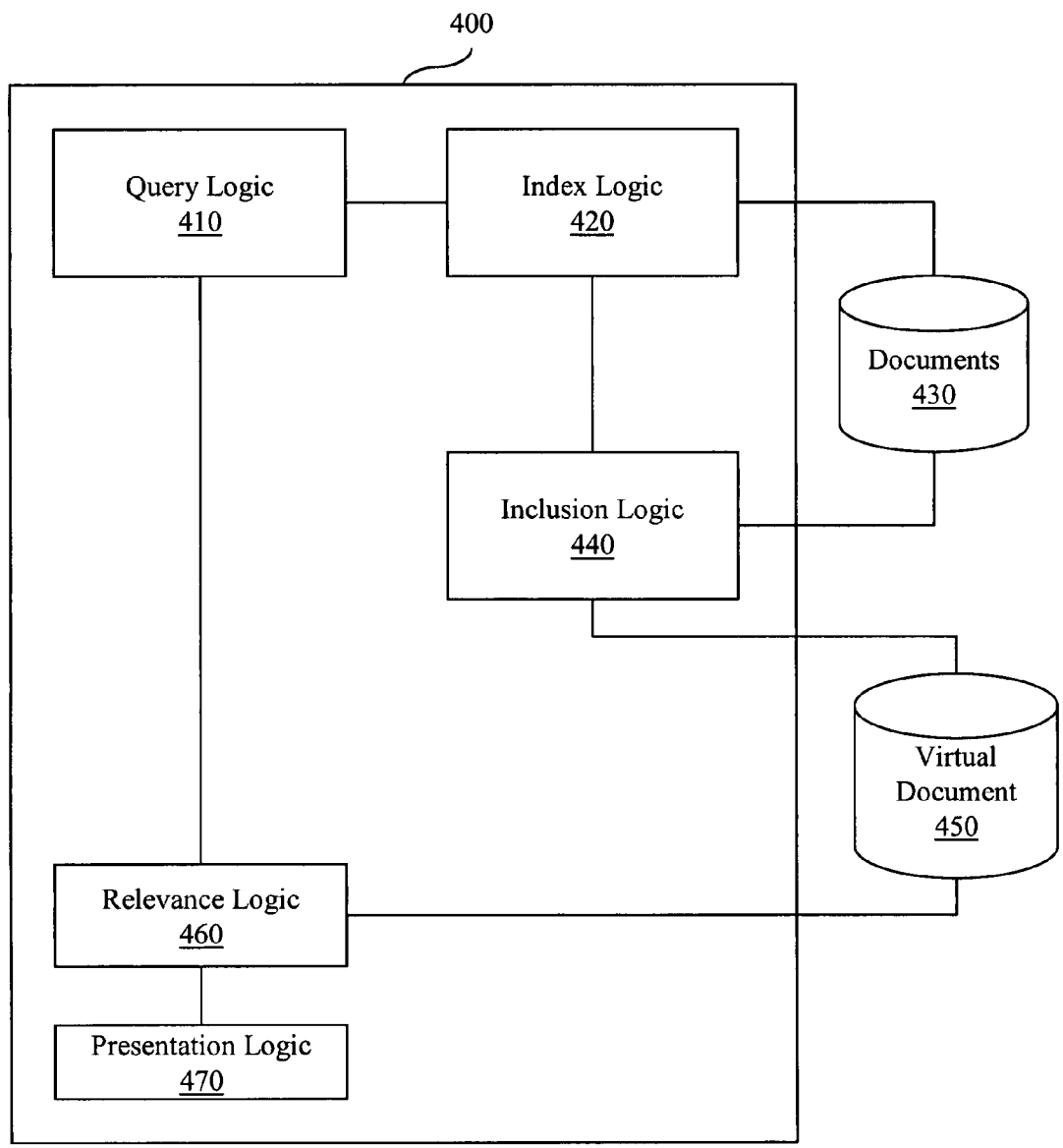
FIG. 4 illustrates another example system associated with identifying, creating, and scoring virtual documents relevant to a query.

FIG. 4 illustrates a system 400 associated with identifying, creating, and scoring virtual documents that may be relevant to a query. System 400 includes some elements similar to those described in connection with system 300. For example, system 400 may include a query logic 410, an index logic 420, an inclusion logic 440, and a relevance logic 460. Similarly, system 400 may use index logic 420 to identify potentially relevant documents in a set of documents 430 and may use inclusion logic 440 to produce a virtual document 450. However, system 400 may include additional elements.

For example, system 400 may include a presentation logic 470 to present data concerning a document(s) that have been determined to be relevant to a query. In one example, presentation logic 470 may present data concerning a base document that has been determined to be relevant to a query. In another example, the presentation logic 470 may only present data concerning a base document. In yet another example, presentation logic 470 may present data concerning both a base level document(s) and a first level document(s) related to the base document. In yet another example, presentation logic 470 may even present data concerning a second level document(s) related to the first level document(s). Presentation logic 470 may present information concerning a virtual document that scores above a relevancy threshold. The relevancy threshold may be a pre-defined value, may be a user-configured value, may be a relative threshold (e.g., top 5%), and so on. In one example, presentation logic 470 may be implemented as a portion of a graphical user interface (GUI).

Figure 5:
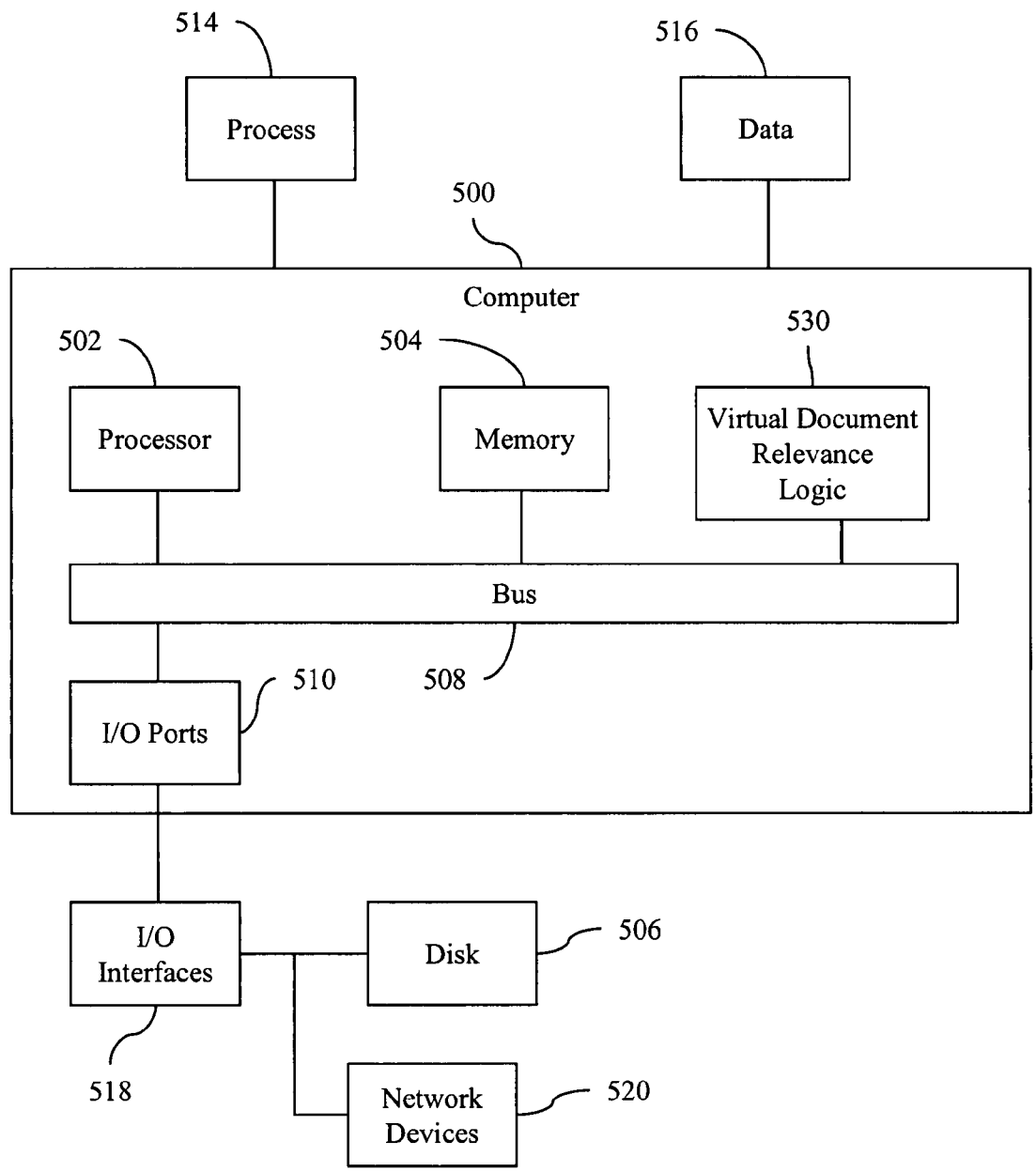
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a virtual document relevance logic 530. Virtual document relevance logic 530 may facilitate creating virtual documents that may be relevant to a query and may also facilitate determining a relevance for the created virtual document(s). Thus, virtual document relevance logic 530 may include means (e.g., data store, memory) for storing data to identify documents in which a term appears and for storing data to identify a relationship between two documents. Virtual document relevance logic 530 may also include means (e.g., hardware, software, firmware) for receiving a query and means (e.g., hardware, software, firmware) for processing the stored data that identifies documents in which a term appears. The data may be processed to identify a first document relevant to the query. Virtual document relevance logic 530 may also include means (e.g., hardware, software, firmware) for processing the data that identifies a relationship between two documents to identify a second document(s) related to the first document. Finally, the virtual document relevance logic 530 may include means (e.g., hardware, software, firmware) for determining the relevance of a hybrid document to the query.

Generally describing an example configuration of the computer 500, the processor 502 can be a variety of various processors including dual microprocessor and other multiprocessor architectures. The memory 504 can include volatile memory and/or non-volatile memory. The non-volatile memory can include, for example, ROM, PROM, EPROM, EEPROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be an optical drive (e.g., a CD-ROM, a CD recordable drive (CD-R drive), a CD rewriteable drive (CD-RW drive), a digital video ROM drive (DVD ROM)). The memory 504 can store, for example, processes 514 and/or data 516. The disk 506 and/or memory 504 can store an operating system that controls and allocates resources of the computer 500.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium having stored thereon computer-executable instructions that if executed by a computer cause the computer to perform a method, the method comprising:
   locating a document identifier in an index entry, where an index entry stores a value to match to a term in a query;
   determining whether the index entry includes an expansion identifier;
   upon determining that the index entry includes an expansion identifier, producing an expanded document by expanding a document associated with the document identifier with a document associated with the expansion identifier;
   determining a relevance value corresponding to the relevance of the expanded document to the query; and
   providing a signal corresponding to the relevance value.

2. The non-transitory computer-readable medium of claim 1, where the expansion identifier relates a first document to a second document as one or more of, an attaching document, an attached document, a referencing document, or a referenced document; and
   wherein the expanded document is produced by logically expanding the first document and the second document into a logically expanded document that is a combination of at least the first and second documents.

3. The non-transitory computer-readable medium of claim 1, where determining the relevance of the expanded document includes calculating a term frequency for the term in the query and an inverse document frequency for the document associated with the document identifier.

4. The non-transitory computer-readable medium of claim 3, where determining the relevance of the expanded document includes calculating an expansion inclusion frequency for the document associated with the expansion identifier, the expansion inclusion frequency being related to the frequency with which the document associated with the expansion identifier is used to expand a document.

5. The non-transitory computer-readable medium of claim 3, where determining the relevance of the expanded document includes, upon determining that two or more query terms appear in the expanded document, computing a nearness value for the two or more terms.

6. The non-transitory computer-readable medium of claim 5, including, upon determining that a first query term appears in a first document included in the expanded document and that a second query term appears in a second document included in the expanded document, updating the nearness value with a document size.

7. The non-transitory computer-readable medium of claim 1, where the method includes providing a signal that identifies a set of documents whose relevance to the query exceeds a threshold.

8. The non-transitory computer-readable medium of claim 7, where the set of documents may only include documents identified by a document identifier in an index entry.

9. The non-transitory computer-readable medium of claim 7, where the set of documents may include documents identified by a document identifier in an index entry and may include documents identified by an expansion identifier in an index entry.

10. The non-transitory computer-readable medium of claim 1, where producing the expanded document comprises logically including in the expended document a document related to the document associated with the expansion identifier.

11. The non-transitory computer-readable medium of claim 1, where the method includes determining whether the index entry includes an expansion identifier that relates a first document to a second document as one or more of, an attaching document, an attached document, a referencing document, and a referenced document;
   where determining a relevance value corresponding to the relevance of the expanded document to the query includes calculating a term frequency for the term in the query, calculating an inverse document frequency for the document associated with the document identifier, and calculating an expansion inclusion frequency for the document associated with the expansion identifier, the expansion inclusion frequency being related to the frequency with which the document associated with the expansion identifier is used to expand a document, and upon determining that two or more query terms appear in the expanded document, computing a nearness value for the two or more terms, and upon determining that a first query term appears in a first document included in the expanded document and that a second query term appears in a second document included in the expanded document, updating the nearness value; and
   where providing a signal corresponding to the relevance value includes providing a signal that identifies a set of documents whose relevance to the query exceeds a threshold, where the set of documents may include documents identified by a document identifier in an index entry and may include documents identified by an expansion identifier in an index entry.

12. A system, comprising:
   a query logic to receive a query comprising one or more query terms;
   an index logic, embodied at least in part on a non-transitory computer-readable medium, to store a set of index entries and to provide access to data stored in the set of index entries, an index entry comprising a first identifier that identifies a first document in which a term appears, and a second identifier that identifies a second document that is related to the first document;
   an inclusion logic, embodied at least in part on the non-transitory computer-readable medium, to produce a virtual document that includes a base level document and a first level document, the base level document including at least one of the one or more query terms, the first level document being related to the base level document by the second identifier; and
   a relevance logic, embodied at least in part on the non-transitory computer-readable medium, to determine the relevance of the virtual document to the query.

13. The system of claim 12, the first level document being related to the base document as one or more of, an attached document, an attaching document, a referenced document, and a referencing document.

14. The system of claim 13, where the relevance logic is to determine the relevance of the virtual document to the query using a term frequency value, an inverse document frequency value, and a nearness value.

15. The system of claim 14, where the nearness value depends, at least in part, on whether two terms appearing in the virtual document appear in an individual document that comprises a portion of the virtual document.

16. The system of claim 12, including a presentation logic to present data concerning a base document relevant to the query.

17. The system of claim 16, the presentation logic to present data concerning a first level document related to the base document.

18. The system of claim 12, where the virtual document includes a second level document, a second level document being related to a first level document as one or more of, an attaching document, an attached document, a referencing document, and a referenced document.

19. The system of claim 12, comprising:
a presentation logic to present data concerning a base document relevant to the query and concerning a first level document related to the base document,
where the first level document is related to the base level document by the second identifier, the first level document being related to the base level document as one or more of, an attached document, an attaching document, a referenced document, and a referencing document,
where the virtual document selectively includes a second level document related to a first level document as one or more of, an attaching document, an attached document, a referencing document, and a referenced document;
where the relevance logic determines the relevance of the virtual document to the query using a term frequency value, an inverse document frequency value, and a nearness value, where the nearness value depends, at least in part, on whether two terms appearing in the virtual document appear in an individual document that comprises a portion of the virtual document.

20. A system, comprising:
means for storing data to identify documents in which a term appears and for storing expansion data to identify a relationship between two documents;
means for receiving a query;
means for processing the data, including at least a processor and a memory, to identify documents, in response to receiving the query, in which a term appears to identify a first document relevant to the query and identify expansion data associated with the first document;
means for processing the data including at least a non-transitory computer-readable medium that stores instructions that, in response to receiving the query, identify a relationship between two documents to identify one or more second documents related to the first document using the associated expansion data; and
means for generating a hybrid document comprising the first document and the one or more second documents and determining a relevance of the hybrid document to the query.

* * * * *

UNITED STATES PATENT AND TRADEMARK OFFICE
CERTIFICATE OF CORRECTION

PATENT NO. : 8,090,722 B2
APPLICATION NO. : 11/726275
DATED : January 3, 2012
INVENTOR(S) : Krishnaprasad et al.

It is certified that error appears in the above-identified patent and that said Letters Patent is hereby corrected as shown below:

In column 4, lines 34-35, delete "servelet," and insert -- servlet, --, therefor.

Signed and Sealed this
Third Day of April, 2012

David J. Kappos
*Director of the United States Patent and Trademark Office*